United States Patent [19]

Steuerwald

[11] 4,012,891
[45] Mar. 22, 1977

[54] MOWING APPARATUS ADJUSTMENT MEANS

[75] Inventor: Wilfred LeeRoy Steuerwald, Ottumwa, Iowa

[73] Assignee: Deere & Company, Moline, Ill.

[22] Filed: Feb. 25, 1976

[21] Appl. No.: 661,352

[52] U.S. Cl. .............................................. 56/305
[51] Int. Cl.² ....................................... A01D 55/06
[58] Field of Search ............................. 56/296–311

[56] References Cited
UNITED STATES PATENTS

| | | | |
|---|---|---|---|
| 621,562 | 3/1899 | Giffhorn | 56/305 |
| 870,358 | 11/1907 | Griffiths | 56/305 |
| 1,583,167 | 5/1926 | Fehrson | 56/305 |
| 2,024,309 | 12/1935 | Smith | 56/305 |
| 2,269,527 | 1/1942 | Frederiksen | 56/305 |
| 2,706,374 | 4/1955 | Porter | 56/296 |
| 2,735,254 | 2/1956 | Huddle | 56/297 |
| 3,199,279 | 8/1965 | Yeske | 56/305 |
| 3,490,215 | 1/1970 | Chapman et al. | 56/298 |

*Primary Examiner*—Russell R. Kinsey

[57] ABSTRACT

A mowing apparatus of the reciprocating sickle type includes, as is conventional, guards projecting forward from an elongated frame member and a sickle bar assembly, including a plurality of knife sections, reciprocating parallel to the frame member with cutting edges of the knife sections and of the guards in a crop shearing relationship. Somewhat resilient holddown plates are rigidly secured to the frame member and have finger-like portions extending forward over the guards and defining, with the guards, a slot in which the sickle bar assembly reciprocates. Bridge-like adjusting clips each have a rear leg bearing on the frame member and a forward leg bearing downwards on a finger portion of the holddown plates. Clip retaining means are adjustable so as to vary the pressure of the forward leg of the clip on the holddown plate, to control the width of the slot between the holddown plate and the guard and thus the operating clearance between the knife sections and the guard ledger surfaces.

11 Claims, 2 Drawing Figures

MOWING APPARATUS ADJUSTMENT MEANS

BACKGROUND OF THE INVENTION

The present invention relates generally to a mowing apparatus of the reciprocating sickle type and more particularly to means for maintaining the sickle bar of such an apparatus in proper cutting relationship with the sickle guards.

The general mode of operation of reciprocating sickle bar mowing apparatus is well known, as is the particular importance of keeping the sickle bar knife sections substantially parallel to the ledger surface on the guards and maintaining proper clearance between them for good shearing action. Some form of holddown clip or plate extending over the knife sections is generally used for this purpose.

Conventional holddown clips, somewhat similar to the slightly modified form illustrated in U.S. Pat. No. 2,203,982 are still widely used, but have not been entirely satisfactory. The difficulty and inconvenience of adjusting such holddown clips often results in mowers being operated with improper knife clearance. Too much clearance allows crop material to force the knife section away from the cutting edges of the guards greatly reducing cutting efficiency. Too small a clearance results in drag on the sickle bar assembly and an increase in wear rate and power required to drive the mowing apparatus. Adjustment is generally accomplished by bending the forward portion of the holddown clip up or down as required by means of a hammer. This method is time consuming and inconvenient and usually requires removal of the sickle bar so that the adjustment must be checked by means of a gauge rather than by direct measurement with the knife in situ. Some attempts at improvement of this type of holddown clip have involved pivoting the clip in a cradle mounted on the frame member and providing screw adjusting means so that the clearance between the forward part of the clip and the sickle section can be varied.

Both the conventional holddown clip and the screw adjusted versions are typically placed between guards where they suffer additional dual disadvantages — first, of being located so as to snag crop material divided and deflected into this area by the guards, and second, of having only an indirect effect in controlling knife clearances in that they are not directly above the guard ledger surfaces.

Other attempts at improvement have included a variety of less conventional designs including some in which the holddown plate itself is a form of leaf spring or is spring loaded so that there is always holddown pressure on the knife sections although, typically, means are provided for adjusting this pressure. This type of holddown clip is in constant contact with the knife sections and the drag between them increases wear rate and the power required to operate the mowing apparatus.

In another design the holddown clip is centered on the guard and clamped in position with the same screw fastener that retains the guard. Typically, screw adjustment is provided to raise or lower the forward part of the clip but before the screw adjustment can be made, the screw fastener must be loosened to permit pivoting of the holddown clip, consequently loosening the guards and upsetting adjustment of the wear plates between the sickle bar assembly and the frame member.

SUMMARY OF THE INVENTION

Accordingly, a primary object of the present invention is to provide a mowing apparatus having improved means for maintaining the knife sections in proper shearing relationship with the cutting edges of the guards. More particularly, it is an object to provide an adjusting means which, in form and location, offers minimum impedance to the flow of crop material and provides positive adjustment between the holddown plates and guards, and which is low in cost and simple and convenient to use.

The invention comprises cooperating but separate holddown plates and adjusting clips in combination with a conventional mowing apparatus including a frame member, guards and a reciprocating sickle bar assembly. Both holddown plates and guards are rigidly secured to the frame member so that they define a slot ahead of the frame member in which the sickle bar assembly reciprocates.

Forwardly extending finger-like portions of the holddown plates overlay the finger portion of each guard. Bridge-like adjusting clips, carried by the frame member, extend forward and apply downward pressure, selectively, on the forward parts of the holddown plates. When the holddown plates and guards are secured to the frame member, before the installation of the adjusting clips, the forward portions of the holddown plates are substantially parallel to the upper ledger surfaces of the guards, but the slot width between them is somewhat greater than required for efficient cutting. By means of the adjusting clips downward pressure may be applied to deflect the forward portion of the holddown plates to set the desired slot width.

A feature of the present invention is that the adjusting means (the bridge-like clip) is separate from the holddown plate so that adjustment can be made without loosening the guards and holddown plates and disturbing the adjustment between knife and wear plates. Further, by separating the adjusting means from the holddown plate itself, it is possible to optimize the design of both with regard to choice of materials and heat treatment and simplified design for low cost of manufacture.

Another feature of the present invention is that it provides positive infinitely variable adjustment of knife clearance rather than of the pressure of a holddown clip on the knife, so that the penalty of drag between knife sections and holddown clips is not imposed.

Another feature of the invention is that a separate adjusting means is associated with each guard finger, the fore-and-aft axes of the adjusting clip, the holddown plate finger-like portion, and the guard finger all lying substantially in a common plane normal to the frame member. Thus there is direct rather than indirect control of the slot between the holddown plate and the guard and there is individual adjustment at each guard finger. In addition, with the present design, it is inherently more feasible to apply pressure further forward on the holddown plate thus providing more positive control of knife clearance than is possible with existing designs.

Yet another advantage of placing the adjusting clips in line with the guard fingers is that the guard fingers, functioning as dividers, deflect material between the adjusting clips, thus maintaining a smooth flow of crop material across the cutter bar and avoiding any tendency for material to build up on the adjustment clips or their retaining nuts.

DESCRIPTION OF THE PREFERRED EMBODIMENT

Figure 1:
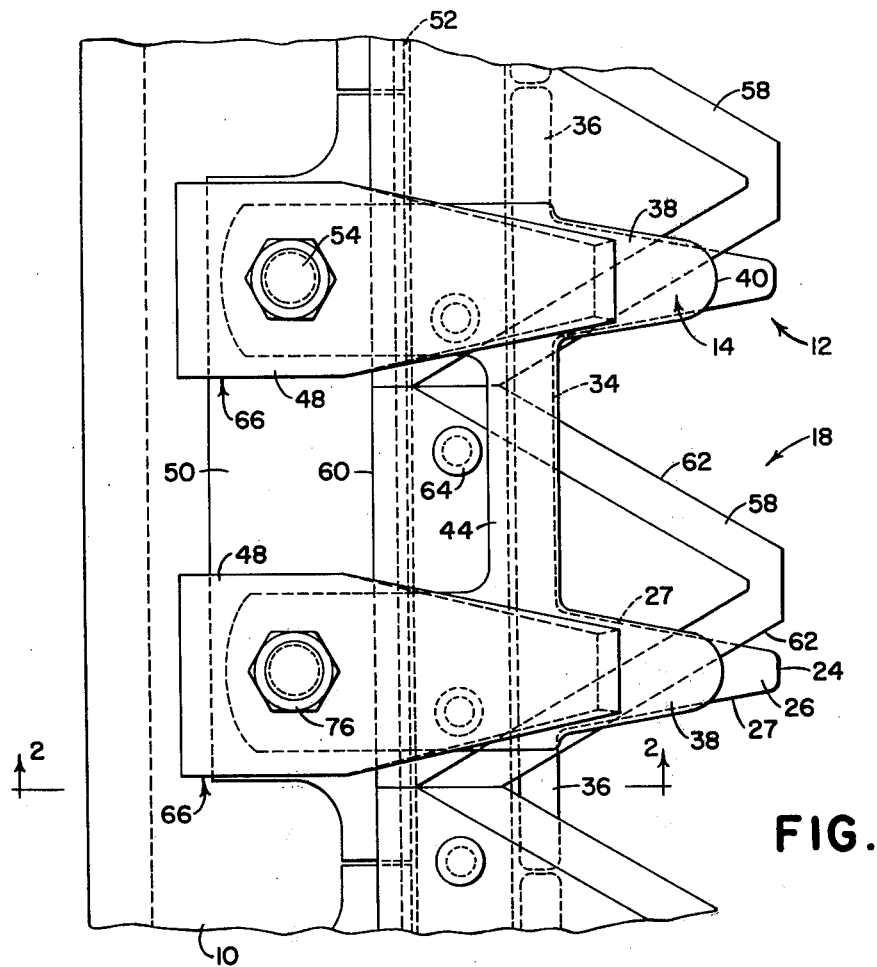
FIG. 1 is a plan view of a portion of a cutter bar of a mowing apparatus embodying the invention.

The invention is embodied in a cutter bar of the non-clog type, a representative portion of such a cutter bar being illustrated in the drawings.

As is well known, such cutter bars are typically part of a mowing apparatus supported by a frame carried on or propelled by a tractor or the like. The mowing apparatus is advanced in a field of standing crop with the cutter bar generally transverse the direction of travel, the cutter bar severing the crop which, in effect, passes over the bar to be deposited on the ground behind it or onto a conveyor or floor included in a harvesting header with which the moving apparatus is associated.

The cutter bar includes an elongated transversely extending frame member 10 having a generally rectangular cross section. A plurality of mower guards, indicated generally by the numeral 12, are mounted side by side on the underside of the frame member 10 and extend forwardly therefrom, and a plurality of holddown plates, indicated generally by the numeral 14, are similarly mounted side by side on top of the frame member 10 and extend forwardly therefrom, the guards 12 and holddown plates 14 defining a horizontal transversely extending slot 16 between the holddown plates and the guards and forwardly of the frame member. The slot 16 accommodates an elongated, transversely extending sickle bar assembly, indicated generally by the numeral 18, the sickle bar assembly being reciprocated longitudinally, in a transverse direction relative to the direction of machine travel, by a conventional drive means at one end of the cutter bar.

The guards 12 in the illustrated embodiment are of the double type, and each guard includes a pair of fore-and-aft finger-like guard bodies 20, only a single guard being illustrated in its entirety in the drawings since the other guards on the cutter bar are substantially identical. Each guard body 20 has an arcuate bottom side 22, the rearward portion of which is generally horizontal while the forward portion curves upwardly toward a front point 24. Each guard body also includes a forward, horizontal top or ledger surface 26, the guard body also tapering forwardly toward the front point 24 in a horizontal plane so that the ledger surface has a somewhat trapezoidal shape. The intersection of the horizontal ledger surface 26 with the sides of the guard body 20 forms generally fore-and-aft cutting edges 27 along the opposite edges of the ledger surface 26.

The guard bodies 20 include rearward portions 28 having horizontal top surfaces 30 below the level of the ledger surfaces 26, the surfaces 30 seating against the underside of the frame member 10. The elevated ledger surfaces 26 are spaced forwardly of the front side of the frame member 10 so that the guard bodies form recesses 32 between the frame member and the ledger surfaces 26 above the top surfaces 30. The rear portions 28 of the guard bodies in each double guard 12 are interconnected by a transverse member that is not shown in detail and are further connected by a transverse trash bar 34 that extends between the guard bodies 20 immediately in front of the recesses 32, the top of the trash bar 34 being generally on the same plane as the guard ledger surfaces 26. A pair of trash bar extensions 36 extend outwardly from the outer side of each pair of connected guard bodies 20 in alignment with the trash bar 34 between the guard bodies, the extensions extending to the extensions of the adjacent guards.

The holddown plates 14 are similarly of the double type and each plate includes a pair of generally fore-and-aft finger portions 38 that taper forwardly to blunted or curved forward ends 40. The sides of the forward part of the finger portions 38 are in general vertical alignment with the cutting edges 27, although the forward ends 40 are offset rearwardly from the front points 24 of the respective guard bodies. The holddown plates are relatively thin and lay in a horizontal plane, the forward part of the finger portions 38 including horizontal lower surfaces 42 opposite the ledger surfaces 26, the opposite surfaces 26 and 42 forming the top and bottom sides of the slot 16. The finger portions 38 of the holddown plate are connected by a horizontal bar 44 above the guard trash bar 34, and the finger portions are deformed upwardly to form recesses 46 above the guard recesses 32.

Each holddown plate finger portion 38 includes a horizontal rear portion 48 overlying the frame member 10, and a horizontal wear plate 50 is interposed between the rear portions 48 of each holddown plate and the top of the frame member 10, each wear plate 50 including a forward downwardly extending lip 52 that overlaps the upper forward corner of the frame member 10. The rear portions 28 of each guard body and the rear portions 48 of each holddown plate are provided with vertically aligned bores that are further aligned with bores in the frame member 10 and the respective wear plates 50, and a vertical bolt 54 extends upwardly through the aligned bores, a first or lower nut 55 being threadable on each bolt 54 to clamp the rear portion of each guard body and the rear portion of each holddown plate to the respective bottom and top sides of the frame member 10. Thus, each guard 12 and each holddown plate 14 is connected to the frame member by a pair of bolts 54.

Figure 2:
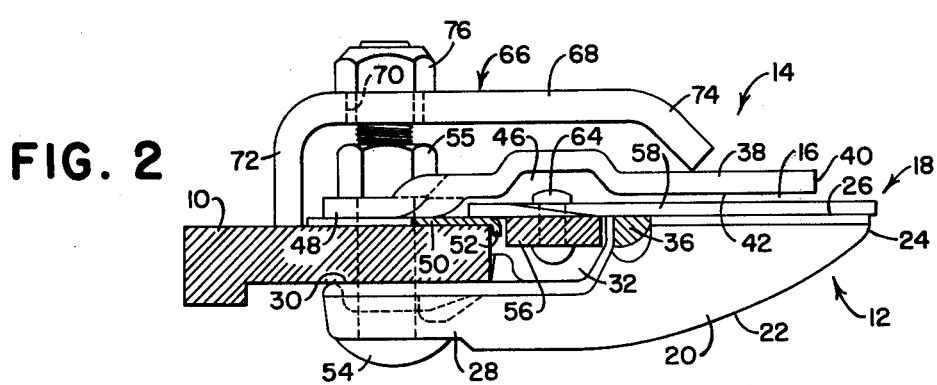
FIG. 2 is a sectional view taken on line 2—2 of FIG. 1.

As stated above, the sickle bar assembly 18 reciprocates in the slot 16, the sickle bar assembly 18 including a transversely extending sickle support bar 56, that has a rectangular cross section and is disposed in the guard recess 32. Mounted on top of the bar 56 are a plurality of generally triangular knife or sickle sections 58. The sickle sections 58 have truncated corners, although they are generally in the form of isosceles triangles with rearward, transversely extending bases or edges 60 and forward apexes, the sickle sections having cutting edges 62 along its opposite forwardly and inwardly inclined sides. As is apparent, the sickle sections are mounted side by side on the top of the sickle support bar 56 with their bases or rearward edges 60 aligned, each sickle support section being secured to the sickle bar 56 by a pair of rivets 64, the recess 46 in the holddown plate accommodating the heads of the rivets. As is apparent from FIG. 2, the forward portions of the sickle sections slide along the guard ledger surfaces 26, with the cutting edges 62 in registry with the cutting edges 27, so that the corresponding cutting edges 27 and 62 sever crop material as the sickle bar assembly reciprocates. As also shown in FIG. 2, the rearward ends of the sickle sections rise on the wear plates 50 with the wear plate lips 52 being engageable with the rearward side of the sickle support bar 56.

Mounted on each bolt 54 is a bridge-like adjusting clip 66, each adjusting clip overlying a holddown plate finger portion 38. Each adjusting clip includes a horizontal fore-and-aft center portion 68 that is provided with a vertical bore 70 that receives the upper end of a bolt 54 above its associated nut 55. Each adjusting clip has a vertical transversely extending rear leg 72, the bottom end of which seats against the top of the frame member 10 adjacent the rearward edge of the wear plate 50. Each clip 66 also includes a forwardly and downwardly inclined front leg 74 that seats against the top of the holddown plate finger portion 38 forwardly of the recess 46. An upper self-locking nut 76 is threadable on each bolt 54 and bears against the top of the center portion 68 of the respective adjusting clip 66. As is apparent, the bottom of the rear leg 72 acts as a fulcrum for the adjusting clip, so that when the upper nut 76 is tightened on the bolt 54, the front leg 74 of the adjusting clip bears against the top of the holddown plate.

The holddown plates 14 are made of a stiff but somewhat resilient material, in a shape so that when the lower nuts 55 are tightened, the finger portions 38 are substantially parallel to the adjacent ledger surface 26. The upper, self-locking nut 76 is then tightened to apply downward pressure to the finger portion of the holddown plate to deflect it so that it arrives at an optimum spacing from the opposite ledger surface. Normally the spacing would be slightly greater than the thickness of the knife sections, so that the holddown plates do not bear heavily against the sickle bar assembly to create excessive friction therewith, although the clearance is held to a minimum to assure adequate registry of the sickle section cutting edges with the ledger surface cutting edges. Although the finger portions of each holddown plate are interconnected, the holddown plates are made of sufficiently resilient material that the respective holddown finger portions 38 are individually adjustable by the respective adjusting clips 66.

As is apparent, the adjusting clips extend sufficiently forward on the holddown plates that they reinforce the holddown plate finger portions directly above the cutting zone where the stresses are the greatest. As is also apparent, the adjusting clips are narrower than their respective holddown plate fingers and are inclined downwardly and forwardly so that the clips do not interfere with the free flow of crop material over the cutter bar after the crop material is divided by the guards and the holddown plates. As is further apparent, adjustment of the clearance between the holddown plates and guards to compensate for wear or distortion of the parts as a result of use is easily effected by simply tightening or loosening the respective upper nuts 76. The holddown plates can also be adjusted to provide adequate clearance for removal of the entire cutter bar assembly by simply adjusting the upper nuts 76 without affecting the mounting of the guards and the holddown plates on the cutter bar frame member 10.

I claim:

1. In a cutting apparatus of the reciprocating sickle type adapted for cutting standing vegetation and having an elongated frame member generally transverse to the direction of cutting apparatus travel, a plurality of sickle guards having finger portions extending forward from the frame member and cutting edges, fastening means rigidly securing the guards to the frame member, and an elongated reciprocating sickle bar assembly including a plurality of knife sections with angled forwardly converging cutting edges and upper and lower surfaces, each cutting edge intersecting with a cutting edge on the adjacent section at a rearward vertex and registering with the cutting edges of the guards as the sickle bar assembly reciprocates, the combination therewith of an improved holddown means for maintaining the knife sections of the sickle bar assembly in cutting relationship with the guards, and comprising:

a plurality of somewhat resilient holddown plates having rear and forward portions, the rear portions being rigidly secured to said frame member by said fastening means and the forward portions extending over the sickle bar assembly and guards, each forward portion being substantially parallel to and closely adjacent to the upper surfaces of said knife sections and vertically above a finger portion of a guard so as to confine the sickle bar assembly in a cutting relationsip with the guards; and adjustable bias means, supported by the frame member and structurally separate from but operatively engaging the holddown plates for selectively biasing the forward portions of the holddown plates downward relative to the rear portions so as to change the distance between said forward portions and the cutting edges of the guards.

2. The invention defined in claim 1 wherein the adjustable bias means engages the holddown plates forward of the fastening means.

3. The invention defined in claim 2 wherein the fastening means includes an adjustable retaining means engaging the bias means so as to provide a fulcrum for said bias means.

4. The invention defined in claim 3 wherein the bias means includes a plurality of bridge-like clips each having a central portion including a hold, and forward and rear legs extending from said central portion, the rear leg being pivotally supported above the frame member in fixed relation thereto and the forward leg bearing on the holddown plate forward of the fastening means.

5. The invention defined in claim 4 wherein the fastening means further includes a bolt and a first nut carried by the bolt, tightened to secure the guards and the rear portions of the holddown plates rigidly to the frame member, and an upward extension of said bolt, said extension passing through the hole in the bridge-like clip, and wherein the adjustable retaining means includes a nut threaded onto the extension of said bolt, engaging and operable to apply pressure to the central portion of said clip whereby the clip, acting as a lever and pivoting on said rear leg and at said fulcrum, transfers pressure through the forward leg of the clip to the forward portion of the holddown plate so as to bias the forward portion of the holddown plate towards the knife section.

6. The invention defined in claim 5 wherein the number and spacing of the clips and the finger portions of the guards on the frame member correspond.

7. The invention defined in claim 6 wherein the respective fore-and-aft axes of the clips and the finger portions of the guards lie substantially in common planes normal to the frame member whereby separate adjustment means are provided for the holddown plates adjacent the finger portion of each guard.

8. The invention defined in claim 7 wherein the forward portions of the holddown plates include finger-like extensions substantially overlaying the finger portions of the guards and wherein the forward legs of the clips bear on the finger-like extensions of the holddown plates.

9. In a cutting apparatus of the reciprocating sickle type adapted for cutting standing vegetation and having an elongated frame member generally transverse to the direction of cutting apparatus travel, a plurality of sickle guards having vertical bores and ledger surfaces including cutting edges and extending forward from the frame member, an elongated reciprocating sickle bar assembly, including a plurality of knife sections with angled forwardly diverging cutting edges and upper and lower surfaces, each cutting edge intersecting with a cutting edge on the adjacent section at a rearward vertex and registering with the cutting edges of the ledger surfaces as the sickle bar assembly reciprocates, the combination therewith of an improved holddown means for maintaining the knife sections of the sickle bar assembly in cutting relationship with the guards, and comprising:

a plurality of somewhat resilient holddown plates having rear portions with vertical bores and forward portions, including finger-like extensions, each extension being substantially parallel to and closely adjacent to the upper surfaces of said knife sections and overlaying a guard ledger surface so as to confine the sickle bar assembly in a cutting relationship with the cutting edges of the ledger surfaces;

a plurality of bridge-like clips, each having a central portion including a hole and forward and rear legs extending downward from said central portion, each rear leg being pivotally supported above the frame member in fixed relation thereto and each forward leg respectively bearing on a finger-like extension of a holddown plate;

a plurality of fastening means operative to attach the rear portions of the holddown plates and the guards to the frame member, each fastening means including a bolt extending through a bore in a guard and a bore in a holddown plate and having an upwardly directed threaded extension extending through the hole in the clip, and a first nut threadably engaging and cooperating with the bolt to rigidly secure the guards and rear portions of the holddown plates to the frame member; and a second nut threadably and adjustably engaging the threaded extension and operable to apply downward pressure to the central portion of the clip whereby the clip, acting as a lever, and pivoting on its rear leg applies pressure through its forward leg to the forward portion of the holddown plate biasing it towards the ledger surface of the guard.

10. The invention defined in claim 9 wherein the unbiased form of the holddown plates is such as to require deflection of the finger portions towards the ledger surfaces of the guards to hold the knife sections in efficient cutting relationship with the guards.

11. The invention defined in claim 10 wherein the frame member carries wear plates for the sickle bar assembly, said wear plate and holddown plates having rear edges and wherein the rear legs of the bridge-like clips engage said edges so as to limit rotation of the clips about the bolt and maintain their alignment with the finger portion of the holddown plates.

* * * * *